ered by the Secretary of the
United States Patent [19]
Sutter

[11] 3,807,670
[45] Apr. 30, 1974

[54] ROCKET CATAPULT

[75] Inventor: Raymond C. Sutter, Philadelphia, Pa.

[73] Assignee: The United States of America as represented by the Secretary of the Army, Washington, D.C.

[22] Filed: Feb. 6, 1973

[21] Appl. No.: 330,148

[52] U.S. Cl. .................... 244/122 AB, 244/122 AD
[51] Int. Cl. .......................................... B64d 25/10
[58] Field of Search ..... 244/122 R, 122 A, 122 AB, 244/122 AC, 122 AD, 122 AE, 122 AH

[56] References Cited
UNITED STATES PATENTS

| | | | |
|---|---|---|---|
| 2,900,150 | 8/1959 | Hirt et al. | 244/122 |
| 3,115,320 | 12/1963 | Hirt | 244/122 |
| 3,116,900 | 1/1964 | Fulton | 244/122 |
| 3,202,385 | 8/1965 | Waecker et al. | 244/122 |
| 3,282,161 | 11/1966 | MacDonald et al. | 244/122 |
| 3,417,947 | 12/1968 | Valentine | 244/122 |
| 3,735,948 | 5/1973 | MacDonald et al. | 244/122 |
| 3,034,289 | 5/1962 | Stott et al. | 244/122 |

FOREIGN PATENTS OR APPLICATIONS

| | | | |
|---|---|---|---|
| 869,486 | 5/1961 | Great Britain | 244/122 |

*Primary Examiner*—George E. A. Halvosa
*Assistant Examiner*—Edward R. Kazenske
*Attorney, Agent, or Firm*—Edward J. Kelly; Herbert Berl; William Sommer

[57] ABSTRACT

A rocket catapult ejection arrangement for a seat-occupant mass of a disabled aircraft in which the rocket motor will still function should the rocket propellant be subjected to premature ignition due to seal leakage or launch tube failure. Existing rocket catapults would blow up under such conditions, and this could be fatal to the seat occupant.

8 Claims, 4 Drawing Figures

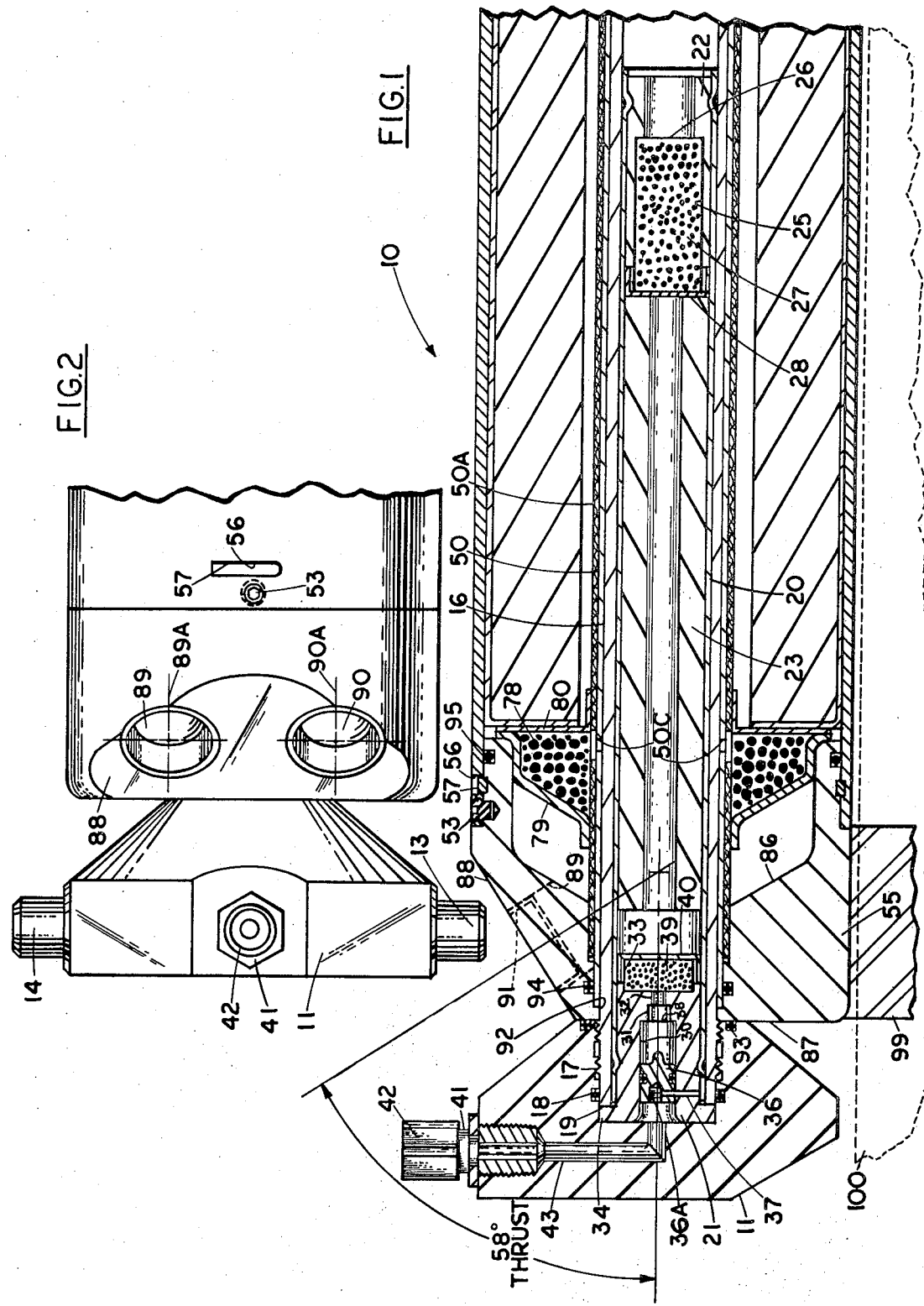

ROCKET CATAPULT

This invention described herein may be manufactured, used, and licensed by or for the Government for governmental purposes without payment to me of any royalty thereon.

This invention relates to rocket catapults, and more particularly, to an improved rocket catapult ejection system for a seat-occupant of a disabled aircraft.

In existing rocket catapult emergency ejection systems for seat-occupants of a disabled aircraft, it has been observed that during test conditions, a premature ignition of the rocket propellant has occasionally occurred and the ignition of the rocket propellant caused the apparatus to blow up since the rocket nozzle of exhaust ports were not yet open to the atmosphere during the initial portion of the catapult phase of operation. If this should happen where the apparatus is secured to a seat-occupant mass, the fragments from the adverse explosion could possibly seriously or fatally injure the occupant.

It is an object of the invention to provide an improved rocket catapult emergency ejection arrangement for a seat-occupant of a disabled aircraft in which the aforementioned adversity is safely avoided in the event premature ignition of the rocket propellant occurs.

Another object of the invention is to provide such an arrangement in which predetermined functioning of the rocket phase of operation is assured even though rocket ignition is premature.

A further object of the invention is to provide such an arrangement which is of relatively simple construction, requiring a minimum of parts and cost.

These and other objects, features and advantages will become more apparent from the following description and accompanying drawings in which:

FIGS. 1 and 1A are a longitudinal sectional view of a rocket catapult emergency ejection system for seat occupants of a disabled aircraft embodying the principles of the invention.

FIG. 2 is a partial top plan view of the FIG. 1 and 1A arrangement.

Figure 3:
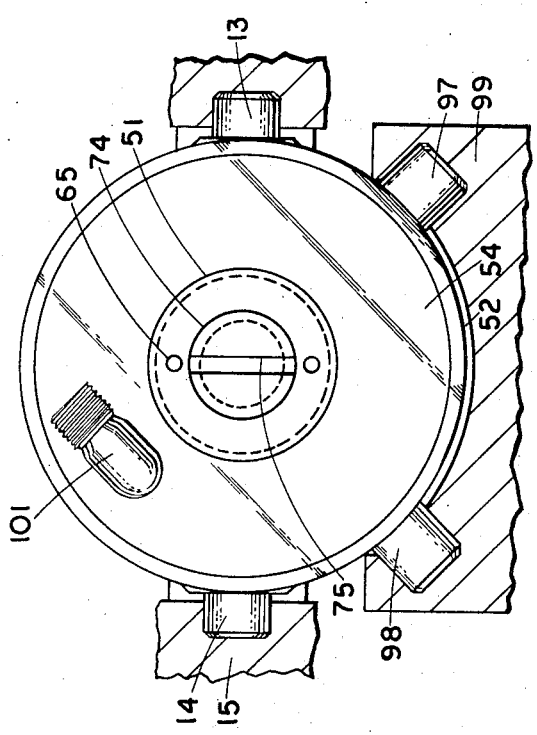
FIG. 3 is a forward end view of the FIG. 1 and 1A arrangement with certain parts removed.
Figure 1A:
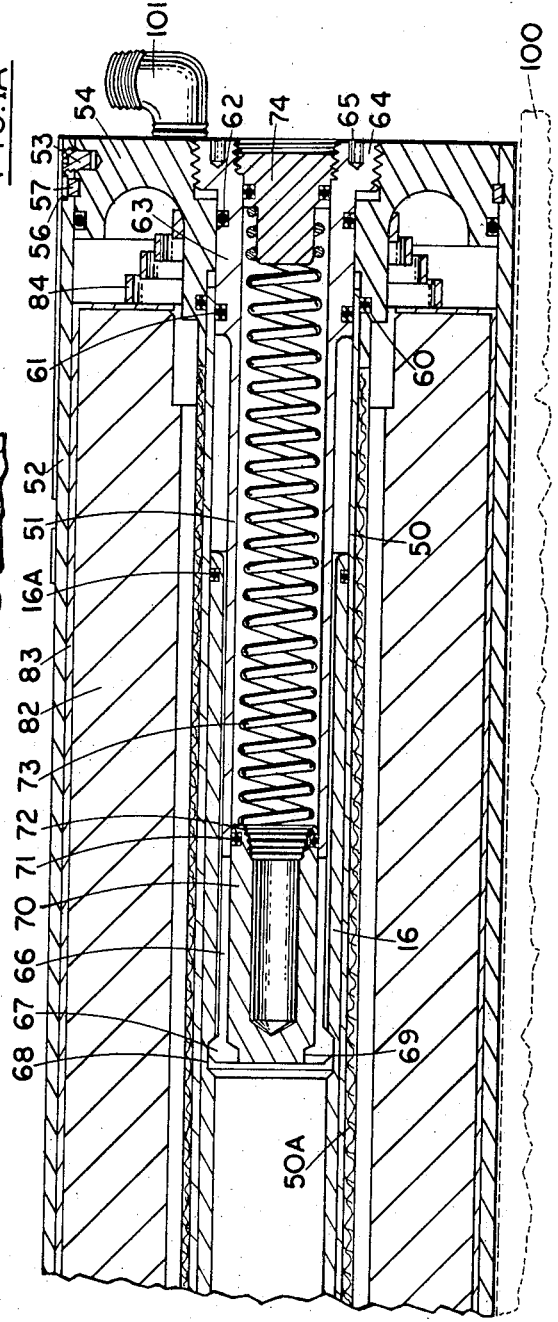

The rocket catapult ejection arrangement, shown generally at 10 (FIG. 1), has a catapult breech 11 of predetermined configuration and provided with a pair of laterally extending and diametrically opposed trunnions 13, 14 (FIGS. 2, 3) which are appropriately secured to a breech trunnion mount 15 of a seat actuator unit (not shown) in the aircraft. The rearward or lower portion of a cylindrical catapult or booster tube 16 has a raised threaded portion 17 for threaded securement in a forwardly opening breech recess 19 provided with a mating thread portion and an O-ring seal 18. The rearward portion of the catapult tube 16 contains a cartridge case 20 that has a cartridge head 21 secured therein by crimping adjacent the breech 11, a cylindrical booster sleeve 22 secured by crimping at the forward end of cartridge case 20, and an intermediate centrally apertured, cylindrical catapult propellant charge 23.

The centrally apertured booster sleeve 22 has a rearwardly opening counterbore recess 25, the rearwardly facing base wall of which has extending thereacross a polyethylene sealing disc 26. Recess 25 is filled with a booster propellant charge 27, and a polyethylene or aluminum sealing cap 28 is affixed to and covers the rearmost end of sleeve 22 which is provided with an accommodating peripheral annular recess.

Cartridge head 21 is a cylindrical member having a plurality of blindly communicating central passages 30, 31, 32, 33 and an outwardly extending rearmost annular flange 34 that seats in the breech recess 19 and extends acorss the rearmost end surface of the catapult tube 16. An initiator actuated firing pin 36, normally secured by shear pin 37, is operatively slidable in the rearmost central passage 30 to strike primer 38 located in passage 31 for ignition of the cartridge igniter pellets 39 that substantially fill forwardmost passage 33. An appropriate polyethylene or aluminum sealing cap 40 is secured to and covers the forward end of the cartridge head 21 which is provided with an accommodating peripheral annular recess. The catapult breech 11 has a centrally apertured fitting 41 secured therein at a predetermined surface location for connection to an actuating gas initiator (not shown) upon removal of internally threaded plastic cap 42. The interior breech passageway 43 fluidly communicates fitting 41 with the rearward surface of firing pin 36 which has a topped recess 36A to facilitate assembly of shear pin 37.

The open forward end of catapult tube 16 is telescopingly received by or between the cylindrical launch tube 50 and the substantially cylindrical tang member 51 of the rocket motor arrangement in which the cylindrical motor tube 52 is connected at its ends by a plurality of securing screws 53 to a forward end or head portion 54 and a rearward nozzle body 55. Suitable slot means 56 in the motor tube facilate insertion of lock wires 57 during assembly. Appropriate O-ring seals 59, 60 are provided on predetermined surfaces of head 54, as are O-ring seals 61, 62 on the external enlarged cylindrical surface portion 63 of tang 51 which has a forwardmost threaded external annular flange 64 secured in head 54 by an appropriate spanner wrench when inserted in spanner wrench holes 65. The rearward portion of the tang 51 has a pluarality of resilient split fingers 66 each of which on its rearward end having an outwardly extending protuberance 67 that upon assembly seat in the catapult tube internal annular recess 68 as well as an inwardly directed flange 69 that cooperatively seat the reduced annular rearward portion of cylindrical plug member 70 slidably mounted in tang 51. Plug 70 carries a forward external O-ring seal 71 and its internal cavity terminates in a threaded forward portion 72 that enables use of a suitable tool for assembly purposes. Tang compression spring 73 of predetermined length extends between the plug forward surface and a stepped rearward surface of retainer 74 which is threadedly secured in the tang forward end and has an end slot 75 (FIG. 3) in its external or forward wall for use of a screw driver during assembly.

The launch tube 50 which is slidably mounted on the catapult tube 16 has a forward portion that seats between the opposing and radially spaced O-ring seals 60, 61. Launch tube 50 is of high strength stainless steel and has a fiber glass covering 50A that extends almost its entire length. Launch tube has a plurality of circumferentially spaced igniter holes 50C each of which is radially aligned with an appropriate hole in the covering 50A to fluidly communicate generated booster gases with rocket igniter pellets 78 that fill the annular rocket igniter cavity defined by the annular polyethylene members 79, 80 of predetermined contour that have their adjacent outer edge portions joined by a suitable cement. The corresponding inner edge portions of members 79, 80 are of cylindrical shape, extending normal to the outer edges and longitudinally of the launch tube and covering to which the inner edges are cemented at longitudinally spaced locations respectively rearward and forward of the igniter holes. The transversely extending outer edge portions of the rocket igniter are positioned substantially between the forward surface of the nozzle body 55 and the rearward end of the cylindrical or tubular rocket motor propellant grain 82 that has a fiber glass inhibitor jacket 83 covering its outer and end surfaces. The rocket grain 82 is biased rearwardly by the grain spring 84 that seats in a rearwardly opening annular recess provided in head 54.

The nozzle body 55 is a substantially cylindrical cup having a forwardly opening recess 86 that accommodates a substantial portion of the rocket igniter. The nozzle body has a rearmost laterally extending flat surface portion 87 that prior to operation abuts a mating forward surface of catapult breech 11. At a corner of the nozzle body or cup there is provided a beveled external surface portion 88 (FIGS. 1, 2) that extends at a predetermined angle (preferably 58°) to the rear surface 87 and is provided with a pair of nozzle ports 89, 90 having centerlines 89A, 90A offset a predetermined distance (FIG. 2) on opposite sides of the rocket catapult longitudinal axis and inclined at such predetermined angle (58°) thereto to define the exit nozzle thrust angle (FIG. 1) of the rocket motor. Protective or moisture-proof nozzle seals in the form of blow out cups 92 are cemented in the nozzle ports until such time that the rocket motor is ignited. The nozzle body 55 has a stepped longitudinal passage 92 that accommodates the rearwards ends of the launch tube and its covering and slidably receives the catapult tube 16. The nozzle ports 89, 90 are thus located entirely externally of the launch and catapult tubes and are readily opened completely for operation at any time the rocket propellant grain should be ignited. Suitable O-ring seals 93, 94 are provided adjacent the nozzle opening 92 and an appropriate O-ring seal 95 is utilized in the nozzle adjacent the lock wire 57. Nozzle trunnions 97, 98 (FIG. 3) protrude radially from nozzle body 55 at predetermined angles that facilitate securement of the rocket motor to the aircraft ejection seat thrust block 99 which is appropriately secured to seat structure 100.

Upon ignition of the initiator actuated catapult cartridge components, the developed pressure gas within the catapult tube 16 forces plug 70 forwardly agains tang spring 73 to release the tang latching split fingers 66 or catapult lock, thereby releasing the entire rocket motor and associated seat-occupant mass for ejection movement longitudinally of the catapult tube. When the launch tube igniter holes 50C move forwardly beyond the catapult tube open end containing O-ring seal 16A, the catapult gas lights the rocket igniter pellets 78 which ignite the rocket propellant grain 82 to commence the rocket phase of operation. The rocket gas blows out the nozzle seals 91 and the nozzle exiting gases impart thrust through a predetermined seat-occupant center of gravity for safe ejection purposes and subsequent parachute deployment, the sequencing of which is initiated by a rocket gas impulse through bleed-off fitting 101. Due to the nozzle arrangement, the rocket phase of operation will be assured even if the rocket grain is ignited prematurely.

Various modifications, alterations or changes may be resorted to without departing from the scope of the invention as defined in the appended claims.

I claim:

1. In a rocket catapult ejection system for a seat-occupant mass of an aircraft having a rocket motor with trunnion means for attachment to an aircraft seat structure, a catapult tube secured to a breech and telescopingly reveived by said rocket motor, and trunnion means on said breech for attachment to an aircraft.

said catapult tube having one open end and another end secured to said breech, a cartridge case in said catapult tube and containing a cartridge head adjacent said breech, catapult propellant charge, and booster propellant charge, said head having means for igniting said catapult propellant charge, said rocket motor having a head portion adjacent said catapult tube one end, a nozzle body adjacent said breech and surrounding and slidably mounted on said catapult tube other end, a motor tube secured to said rocket motor head portion and said nozzle body, a launch tube seated in said nozzle body and slidable on said catapult tube, a tubular rocket motor propellant grain in said motor tube and surrounding a substantial portion of said launch tube, an annular rocket igniter cemented to said launch tube and located between said nozzle body and rocket grain, lateral passage means in said launch tube adjacent said rocket igniter for placing the interior of said rocket igniter in fluid communication with said catapult tube open end when pressure gas developed within said catapult tube moves the rocket motor away from said breech, and port means in said nozzle body located entirely externally of said launch and catapult tubes and in fluid communication with said rocket igniter.

2. The structure according to claim 1 wherein said nozzle body is a substantially cylindrical cup having a forwardly opening recess accommodating a substantial portion of said rocket igniter, a rearmost laterally extending flat surface portion, a beveled external surface portion located at a corner of said cup and extending at a predetermined angle to said rearmost surface portion, said rearmost surface portion having an opening for slidably receiving said catapult tube, and said port means being located in said beveled surface portion.

3. The structure of claim 2 wherein a blow-out cup is cemented in each of said port means to provide said nozzle body with a moisture proof seal.

4. The structure of claim 1 wherein said rocket igniter includes a pair of annular polyethylene members having one set of respective edge portions secured to each other by cement and another set of corresponding edge portions cemented to said launch tube at longitudinally spaced locations, said lateral passage means being located intermediate said longitudinally spaced locations, and rocket igniter pellets filling the annular cavity defined by said polyethylene member.

5. The structure according to claim 1 wherein said cartridge head is a substantially cylindrical member having a plurality of fluidly communicating central passages and an outwardly extending rearmost flange, said flange seated in said breech and extending laterally across the rearmost end surface of said catapult tube, a firing pin in the rearmost of said central passages, cartride igniter pellets in the forwardmost central passage, and primer means in an intermediate passage.

6. The structure of claim 5 wherein said breech has a fitting secured therein for connection to an actuating gas initiator and a passage fluidly communicating said fitting with said firing pin.

7. The structure of claim 1 wherein the forwardmost end of said cartridge case has therein a centrally apertured substantially cylindrical booster sleeve having a rearwardly opening counterbore recess, a polyethylene sealing disc extending across the base wall of said recess, said booster propellant charge substantially filling said recess, and a polyethylene sealing cap covering the rearmost end of said sleeve.

8. The structure of claim 1 wherein a substantially cylindrical tang is secured to said rocket motor head portion and extends rearwardly into said catapult tube open end, the rearward portion of said tang having a plurality of resilient split fingers, the rearward ends of said fingers each having an outwardly extending protuberance and an inwardly directed flange, the internal surface of said catapult tube having an annular recess for normally receiving said finger protuberances, a substantially cylindrical plug slidably mounted in said tang and having a closed rearward end, and a compression spring in said tang and biasing said plug rearwardly.

* * * * *